United States Patent [19]
Miyake et al.

[11] Patent Number: 5,224,068
[45] Date of Patent: Jun. 29, 1993

[54] RECORDING METHOD FOR MAGNETO-OPTIC MEMORY MEDIUM

[75] Inventors: Tomoyuki Miyake, Nara; Mitsuo Ishii, Yamatokoriyama; Hiroyuki Katayama, Nara; Kenji Ohta, Kitakatsuragi, all of Japan

[73] Assignee: Sharp Kabushiki Kaisha, Osaka, Japan

[21] Appl. No.: 638,076

[22] Filed: Jan. 7, 1991

[30] Foreign Application Priority Data

Jan. 10, 1990 [JP] Japan .................. 2-2898

[51] Int. Cl.$^5$ .................. G11C 13/06; G11B 5/716
[52] U.S. Cl. .................. 365/122; 360/59; 369/13; 428/694
[58] Field of Search .................. 365/122; 369/13; 428/694, 900; 357/27; 360/59, 114

[56] References Cited

U.S. PATENT DOCUMENTS

| | | | |
|---|---|---|---|
| 4,695,514 | 9/1987 | Takahashi et al. | 428/432 |
| 4,701,881 | 10/1987 | Tanaka et al. | 365/122 |
| 4,794,560 | 12/1988 | Bell et al. | 365/122 |
| 4,871,614 | 10/1989 | Kobayashi | 369/13 |
| 4,922,454 | 5/1990 | Taki | 365/122 |

FOREIGN PATENT DOCUMENTS

| | | |
|---|---|---|
| 0291248 | 5/1988 | European Pat. Off. . |
| 0330394 | 2/1989 | European Pat. Off. . |
| 0318337 | 11/1989 | European Pat. Off. . |
| 63-157340 | 11/1988 | Japan . |

OTHER PUBLICATIONS

"Dual-Film Disk Hikes Magneto-Optic Density" Electronics Jun. 1986, pp. 24-25.

Primary Examiner—Joseph A. Popek
Attorney, Agent, or Firm—David C. Conlin; George W. Neuner

[57] ABSTRACT

A recording method for a magneto-optic memory medium of exchange-coupled type having a recording layer of a low Curie point and high coercive force and a reading layer of a high Curie point and low coercive force, which comprises the steps of: applying a magnetic field to the magneto-optic memory medium to develop a predetermined data in the reading layer, and then applying both an optical beam and a magnetic field to the magneto-optic memory medium for writing the predetermined data in the recording layer, and simultaneously verifying the data upon the writing on the basis of a Kerr effect of the optical beam caused by the reading layer.

6 Claims, 6 Drawing Sheets

RECORDING METHOD FOR MAGNETO-OPTIC MEMORY MEDIUM

BACKGROUND OF THE INVENTION

1. Field of the Invention

This invention relates to a recording method for magneto-optic memory medium, and more particularly, to a recording method for magneto-optic memory medium including an overwriting to the magneto-optic memory medium by the use of a magnetic field modulating process wherein the writing and verifying of data is simultaneously performed.

2. Description of the Related Art

A thin film of amorphous rare earth-transition metal alloy, such as GdCo, TbFe, GdNdFe, GdTbFe and the like (hereinafter abbreviated as RE-TM film) has been used as a memory medium in a magneto-optic disc device since it has suitable characteristics for magneto-optic recording. Particularly known is a magneto-optic memory medium having an exchange-coupled double-layered structure in which a recording layer of a low Curie point and a high coercive force and a reading layer of a high Curie point and a low coercive force are laminated to improve a reading efficiency of written data ("Magnetization Process of Exchange-Coupled Ferrimagnetic Double-Layered Films", *Japanese Journal of Applied Physics*, Vol. 20, No. 11, November 1981 pp. 2089-2095).

Recording in the exchange-coupled magneto-optic memory medium is performed by applying an optical beam for heating and a magnetic field to the memory medium to write a predetermined data in the writing layer. After writing (and cooling), the data is automatically transcribed to the reading layer having a high Kerr effect due to exchange-coupling by magnetization, and stably retained. Hence, reading can be stably carried out by the use of a Kerr effect of the reading layer which provides an excellent reading efficiency.

Rewriting in the magneto-optic memory medium is carried out usually by the steps (1) erasing of old data, (2) writing of new data, and (3) verification (confirmation of written data). The art at the primitive stage turns the disc once for each of the above steps, so that the disc requires to turn three times every rewriting.

In this regard, the so-called overwriting technique indispensable for a high speed recording process of information has been positively studied. A magnetic field modulation process is regarded as a most readily available and effective means among various configurations of the overwriting technique.

The overwrite technique which allows data to be overwritten performs the aforesaid steps (1) and (2) simultaneously, thereby making higher a speed of recording process of information.

The verification step (3) after overwriting in the above exchange-coupled magneto-optic memory medium is to be carried out in such a manner that the memory medium is cooled enough to cause data in the recording layer to be fully transcribed to the reading layer, then, the data is read therefrom to be checked. Hence, one more turn of the disc is required for the verification step after the overwriting. From this, it is desired to make further higher the speed of recording process, while the verification step is indispensable for ensuring reliability of written data and cannot practically be omitted.

SUMMARY OF THE INVENTION

An object of the invention is to provide a recording method for a magneto-optic memory medium to perform the aforesaid three steps of rewriting simultaneously and realizing a high speed recording process of information.

According to the present invention, there is provided a recording method for a magneto-optic memory medium of exchange-coupled type having a recording layer of a low Curie point and high coercive force and a reading layer of a high Curie point and low coercive force, which comprises the steps of:

applying a magnetic field to the magneto-optic memory medium to develop a predetermined data in the reading layer, and then applying both an optical beam and a magnetic field to the magneto-optic memory medium for writing the predetermined data in the recording layer, and simultaneously verifying the data upon said writing on the basis of a Kerr effect of the optical beam caused by the reading layer.

According to the present invention, the coercive force of the reading layer (called hereunder the first layer) in the magneto-optic memory medium is lower at around a room temperature than the force of the external magnetic field for writing and the coercive force of the recording layer (called hereunder the second layer and typically about 200 kOe higher force than the first layer). Hence, the direction of magnetization in the first layer quickly becomes the same as that of the external magnetic field without a rise of temperature by the optical beam when the external magnetic field for writing which is modulated corresponding to recording signals is applied. As a result, information (a predetermined data) is transcribed to the first layer. In this instance, the first layer exhibits a Kerr rotation angle at a level readily detected at a recording(writing) temperature, so that the information transcribed into the first layer is detected on the basis of the Kerr effect of an optical beam applied to the memory medium, specifically to the second layer for the writing operation. The detected magneto-optic signal is used for verification of the aforesaid information.

Simultaneously with the verification step, the second layer is heated by the optical beam to have a temperature near its Curie temperature, and the same information as the aforesaid is written when the magnetic field for writing is applied to the second layer, resulting in that the writing of the information and the verification are carried out at the same time.

Since the second layer has a higher coercive force, it becomes a stable data-retaining layer at a room temperature after the writing step.

Also, the coercive force of the first layer at around a room temperature is lower than that of the second layer, so that the direction of magnetization of the first layer follows and is stably retained by the second layer with a help of an exchange-coupling force generated between the first and second layers, thereby making the first layer (the reading layer) and the second layer (the recording layer) to be stable record-keeping layers.

According to the recording method for a magneto-optic memory medium of the present invention, the verification of the recorded information can be carried out simultaneously with recording and/or overwriting the information, resulting in that the speed of recording process of information is made higher more than two times in comparison with the conventional art.

BRIEF DESCRIPTION OF THE DRAWINGS

FIG. 1 is a sectional view showing a magneto-optic memory medium used in the present invention.

FIG. 2 is a graph showing a temperature dependency of a magneto-optic characteristic measured from the first layer side of the recording layers of the magneto-optic memory medium.

FIG. 3 is a graph showing a temperature dependency of a magneto-optic characteristic measured from the second layer side of the recording layers of the magneto-optic memory medium.

FIG. 4 is a graph showing a hysteresis characteristic of the magneto-optic memory medium to an external magnetic field.

FIG. 5 is an explanatory view showing a principle of the magneto-optic recording.

FIG. 6 is a view showing a waveform of detected signals on the basis of a Kerr effect of an optical beam upon writing.

FIG. 7 is a view showing the other waveform of detected signals on the basis of a Kerr effect of an optical beam upon writing.

FIG. 8 is a graph showing a compositional dependency of a magneto-optic characteristic of a GdNdFe amorphous alloy film.

FIG. 9 is a graph showing a compositional dependency of the other magneto-optic characteristic of a GdNdFe amorphous alloy film.

FIG. 10 is a graph showing a compositional dependency of a magneto-optic characteristic of a TbFeCo amorphous alloy film.

FIG. 11 is a graph showing a compositional dependency of a magneto-optic characteristic of a DyFeCo amorphous alloy film.

DETAILED DESCRIPTION OF THE PREFERRED EMBODIMENTS

Figure 1:
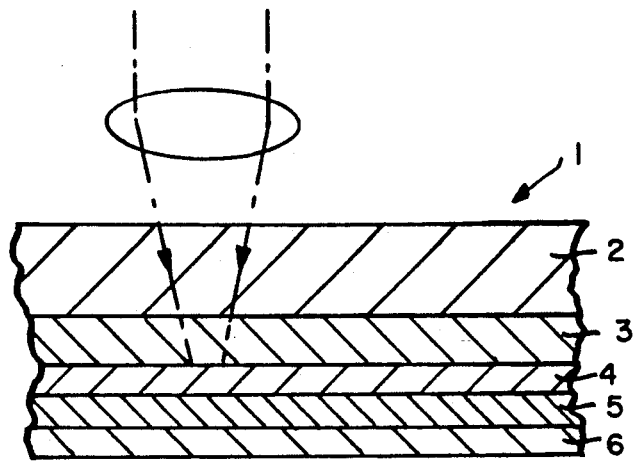
FIGS. 1 through 11 are presented for illustrating an example of the present invention.

The exchange-coupled magneto-optic memory medium used in the present invention comprises a specific recording layer and a specific reading layer, the layers being laminated on an appropriate substrate. It is usually preferable that the reading layer and the recording layer are formed in this order on a transparent substrate, having thereon an intervening first dielectric film made of SiN, AlN, ZnS, $SiO_2$, SiAlON, AlNGe and the like, and the recording layer is coated with a second dielectric film.

The recording layer and the reading layer may employ known various amorphous rare earth-transition metal alloy thin films which are applied to an exchange-coupled magneto-optic memory medium. It is preferable that the reading layer has a Curie temperature of higher than that of the underlying recording layer and the recording temperature upon application of the optical beam, has a Kerr rotation angle of readily detectable level at the writing temperature, and has a coercive force at around a room temperature being lower than the magnetic field for writing and the coercive force of the recording layer.

It is particularly preferable that the recording layer is made of GdTbFe amorphous alloy thin film and the reading layer of GdNdFe amorphous alloy thin film.

It is preferable that the recording layer comprises an amorphous alloy thin film represented by the following formula:

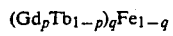

(wherein p and q satisfy the inequalities $0.1 < q < 0.35$, $0 < p \times q < 0.25$, $0 < (1-p) \times q < 0.25$), and the reading layer comprises an amorphous alloy thin film represented by the following formula:

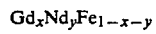

(wherein x and y satisfy the inequalities $0.1 < x < 0.3$ and $0 < y < 0.25$).

These amorphous alloy thin films may be formed by sputtering or deposition, for example, the sputtering process using a target of alloys having corresponding compositions or a composite target in an on-chip type, or a multiple-synchronous deposition process using a multiple source.

Thickness of the recording and reading layers are 5,000 Å or less usually and 100 to 1000 Å preferably in consideration of an extent effected by the exchange-coupling force and a recording sensitivity.

EXAMPLES

Next, an example of the present invention will be detailed with referring to FIGS. 1 through 11.

First, an example of structure of a medium 1 serving as a magneto-optic memory medium of used in the present invention will be detailed. The medium 1 comprises a glass substrate 2 and a dielectric layer 3 made of AlN, a reading layer 4 (the first layer) made of GdNdFe, a recording layer 5 (the second layer) made of GdTbFe, and an another dielectric layer 6 made of AlN, those being formed in this order on the substrate 2 to form a double-layered structure by the reading layer 4 and the recording layer 5. GdNdFe forming the reading layer 4 is an amorphous alloy having a component ratio as Gd 19.0 Nd 4.0 Fe 77.0 at % and 200 Å of thickness. GdTbFe forming the recording layer 5 is an amorphous alloy having a component ratio as Gd 14.0 Tb 14.0 Fe 72.0 at % and 600 Å of thickness.

Figure 2:
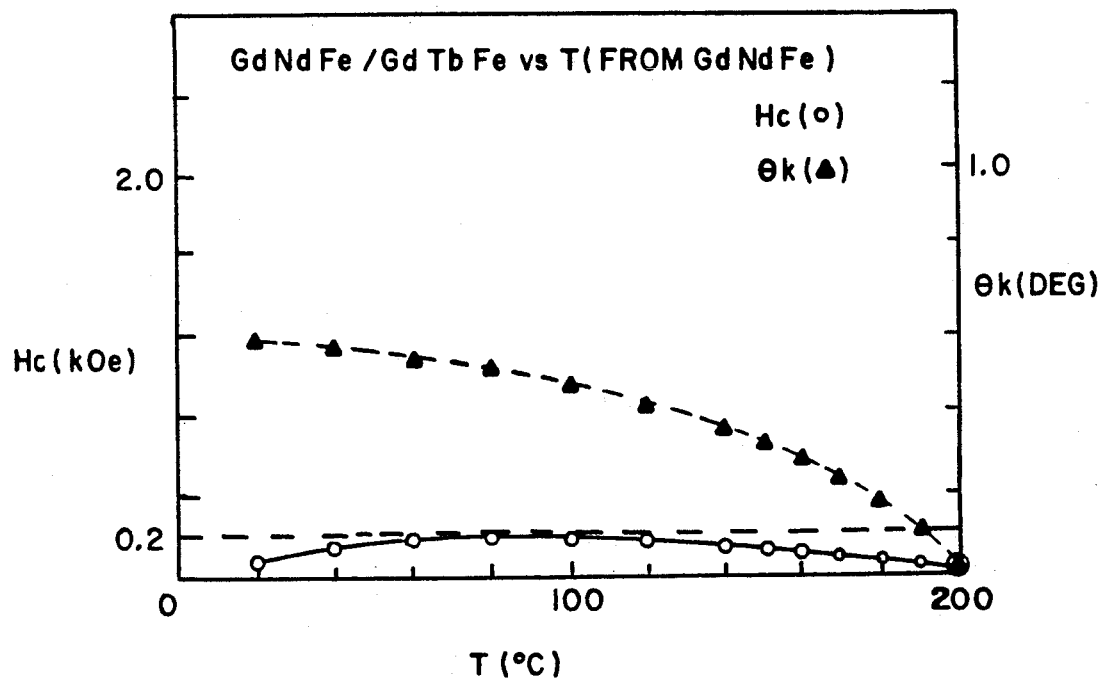

Temperature dependency of a coercive force Hc and a Kerr rotation angle $\theta_k$ which are magneto-optic characteristics of the medium 1 constructed as above were measured from the side of the reading layer 4 (GdNdFe) and the result is shown in FIG. 2 wherein the coercive force $H_c$ is shown by the mark o and the Kerr rotation angle $\theta_k$ by the mark . FIG. 2 reveals that the reading layer 4 has a low coercive force $H_c$ and is readily magnetized and inverted to have uniform magnetization direction in an entire temperature range when a magnetic field higher than 200 Oe is applied to the reading layer 4. Also, the reading layer 4 has a high Curie temperature, so that a Kerr rotation angle $\theta_k$ is large and kept at a value 50% or more of that at room temperature at about 160° C. In a usual magneto-optic recording, the memory layer is raised of temperature to about 160° C. by an optical beam for writing, typically a laser beam. Hence, the reading layer 4 made of GdNdFe is provided with a Kerr rotation angle $\theta_k$ at a level fully and readily detectable at a writing temperature (for example, higher than 0.1 deg), thereby providing a detected signal having a sufficient intensity.

Figure 3:
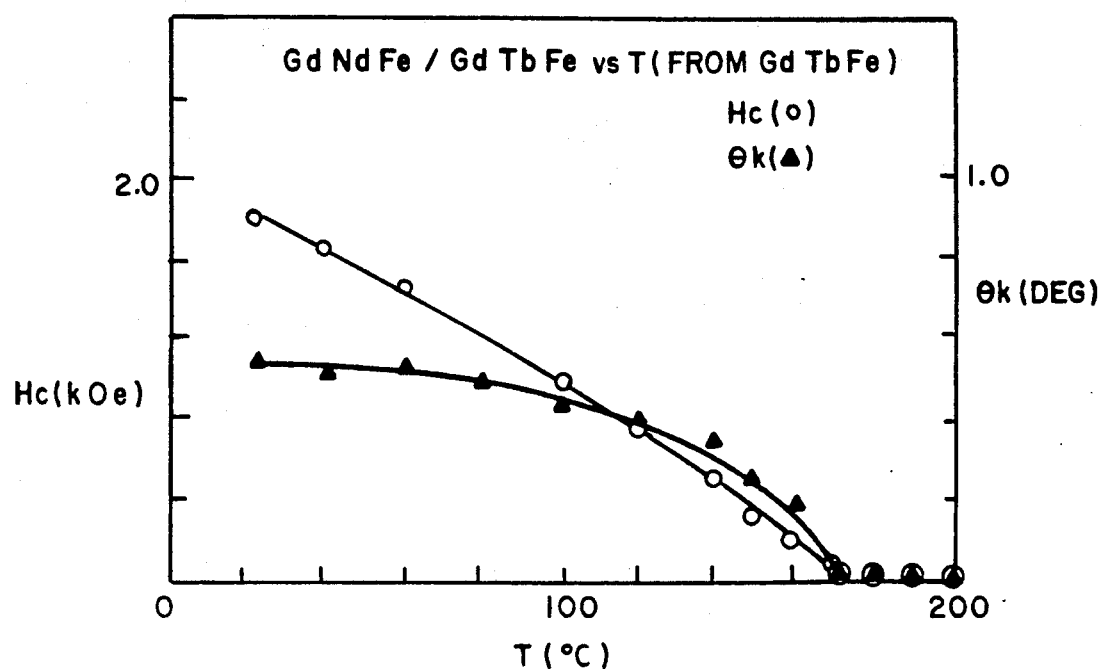

Likewise, temperature dependency of a coercive force Hc and a Kerr rotation angle $\theta k$ which are magneto-optic characteristics of the medium 1 were measured from the side of the recording layer 5 (GdTbFe) and the result is as shown in FIG. 3 wherein the coercive force Hc is shown by the mark o and the Kerr rotation angle by the mark as in FIG. 2. FIG. 3 reveals that the recording layer 5 has a coercive force Hc about 2 kOe at room temperature and is very small at nearly 160° C. of the writing temperature. This is due to the low Curie temperature of the GdTbFe. Hence, the recording layer 5 made of GdTbFe is readily magnetized and inverted to follow the direction of the recording magnetic field when the recording magnetic field is applied to the recording layer 5 at the writing temperature, resulting in that the recorded information can be stably retained at around a room temperature.

Figure 4:
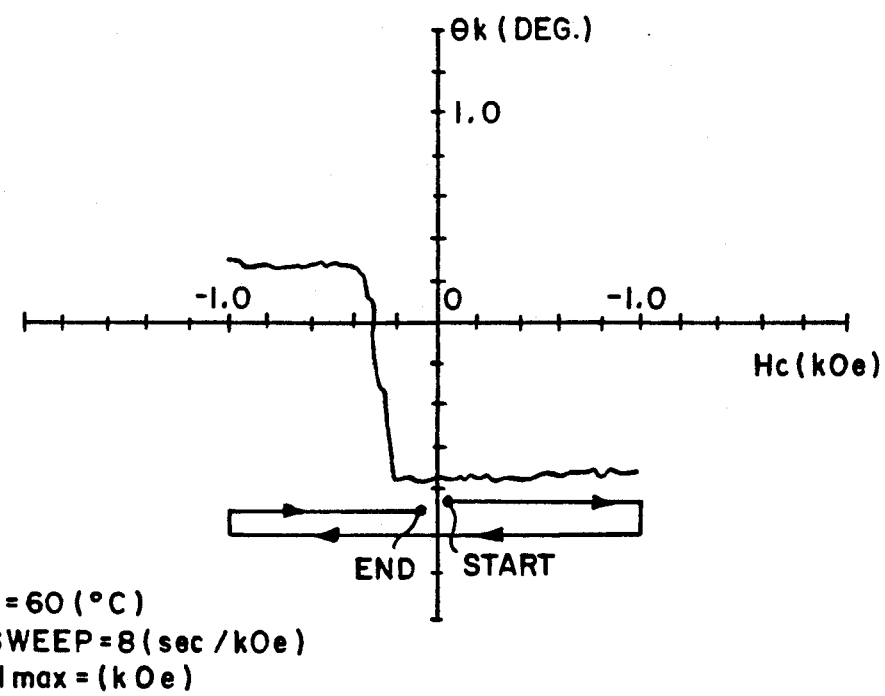
Figure 5:
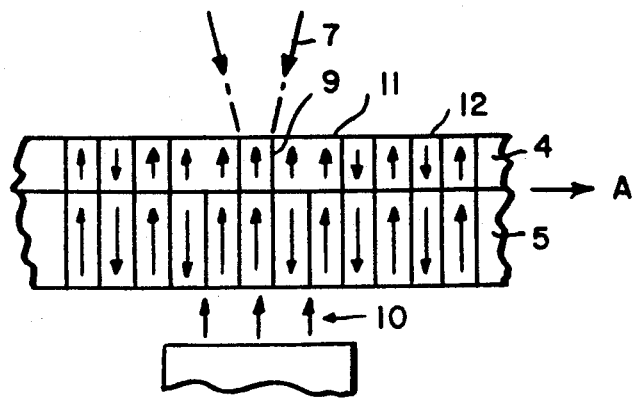

Next, explanation will be given on that the double-layered structure enables magnetization direction of the reading layer 4 to follow that of the recording layer 5 with a help of the exchange-coupling action. FIG. 4 shows hysteresis characteristic of a Kerr rotation angle $\theta_k$ measured from the reading layer side with respect to an external magnetic field H. For measurement, the reading layer 4 and the recording layer 5 were initialized by +2.0 kOe of an external magnetic field at room temperature and subjected to a series of external magnetic field as $0 \rightarrow +1.0$ kOe $\rightarrow 0$ Oe $\rightarrow -1.0$ kOe $\rightarrow 0$ kOe at 60° C. of atmosphere. In FIG. 4, the values of Kerr rotation angle $\theta_k$ are constant when the values of the external magnetic field are positive (the same direction as the initialized magnetization), and are inverted when the value of the external magnetic field is about $-0.2$ kOe. When the applied external magnetic field is further varied from $-1.0$ kOe to $0$ kOe, the value of Kerr rotation angle would be inverted again at about $+0.2$ kOe of the external magnetic field if only the reading layer 4 is provided without the recording layer 5. But, the value of Kerr rotation angle is actually inverted again at about 0.2 kOe and returned to the original value at the state that the hysteresis loop is closed.

The first inversion of the Kerr rotation angle at about $-0.2$ kOe corresponds to the above explanation that the reading layer 4 is readily magnetized and inverted in magnetization direction in an entire temperature range due to an applied magnetic field higher than about 200 Oe. Also, the fact that the values of external magnetic field H is inverted again at about $-0.2$ kOe and returned to the original value in the state of hysteresis loop being closed results just from that, when the external field H causing the reading layer 4 to be inverted was weakened, an exchange-coupling force between the reading layer 4 and the recording layer 5 caused the reading layer 4 to be inverted again. It is because the coercive force Hc of the recording layer 5 is larger than $+1.0$ kOe at the measuring temperature 60° C. as shown in FIG. 3, so that the recording layer 5 is not to be magnetized and inverted by an external magnetic field in the range $+1.0$ kOe to $-1.0$ kOe but keeps its initialized direction of magnetization. Also, the coercive force Hc of the recording layer 5 is enough to apply an exchange-coupling force to the reading layer 4.

As aforementioned, the double-layered structure for recording in the medium 1 allows the exchange-coupling force to be produced in order to follow the magnetization direction of the reading layer 4 to that of the recording layer 5.

Next, a principle of the recording method for the magneto-optic memory medium of the present invention will be detailed. When a magnetic field 10, which runs in the direction shown by the arrow A in FIG. 5 and is modulated corresponding to the predetermined data, is applied to the memory layer of the double-layered structure comprising the reading layer 4 and the recording layer 5, the reading layer 4 becomes identical in magnetization direction to the recording magnetic field 10 before a rise of temperature due to application of a laser beam 7, so that the information (the predetermined data) is transcribed to the reading layer 4. This is because a coercive force of the reading layer 4 is smaller than the level of the magnetic field 10 as aforesaid. Thereafter, when a modulated magnetic field 10 identical in information to the above and the laser beam 7 (for example, of about 4.0 to 10 mW output) are applied to the recording layer 5, the layer 5 is raised in temperature to near the Curie temperature, thereby causing a portion 9 subjected to the elevated temperature to lower in a coercive force and be magnetized along the direction of the magnetic field 10.

By turn, the reading layer 4 has a Kerr rotation angle $\theta_k$ higher enough to be readily detectable at around the writing temperature, so that a detected signal of a sufficient intensity can be obtained from reflection of the laser beam 7 on the basis of its Kerr rotation angle. Since the recorded information is previously transcribed to the reading layer 4 in the same direction as that of the magnetic field, the signals detected from the transcribed information can be applied to verification of recording information.

The detected signals (output by the use of pick-up) in an actual overwriting by use of a floating magnetic head is shown hereunder. The size of the slider of the magnetic head used in the experiment is 6×4 mm to allow the slider to flow about 5 $\mu$m above the surface of medium 1. The magnetic head is of 0.3×0.2 square mm and 1 mm length in a single magnetic pole type with 12 turns of 50 $\mu$m $\phi$ Cu wire, and driving current is $\pm 0.4$ A. The magnetic field generated by the magnetic head was $\pm 200$ Oe.

Figure 6:
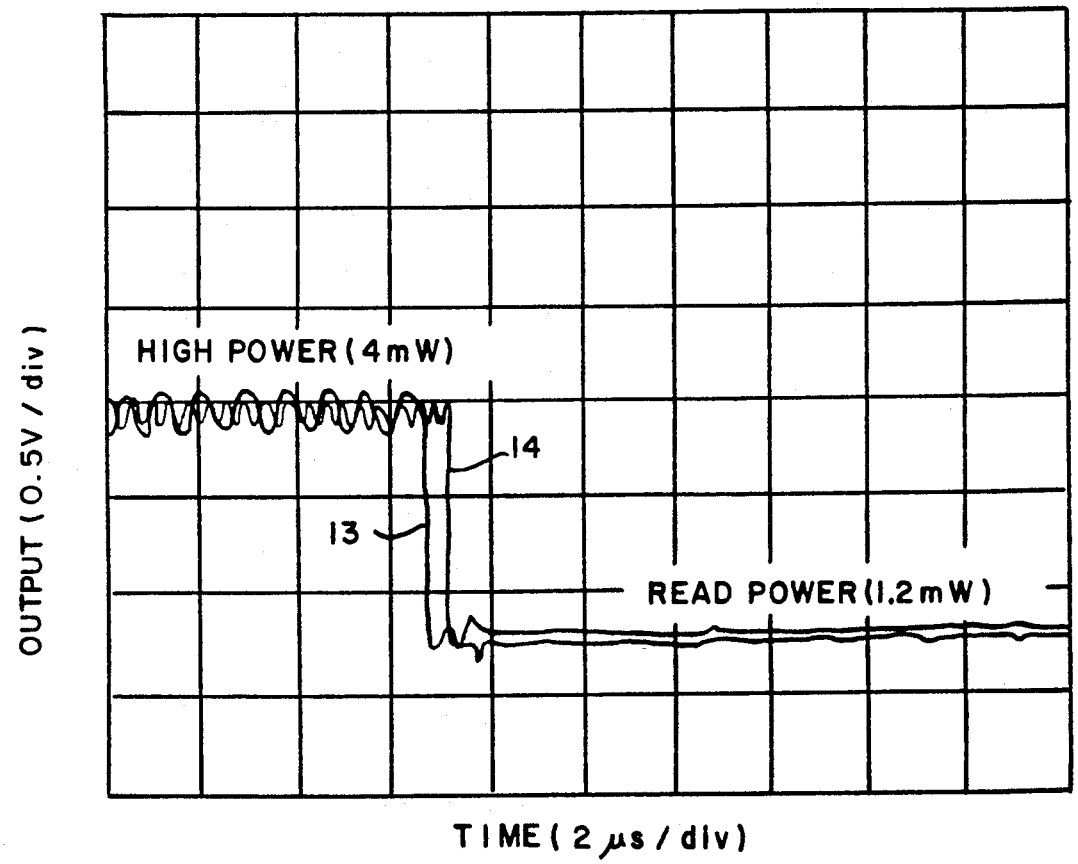

The detected signals upon overwriting by use of the memory medium 1 of the present invention is shown in FIG. 6. The film thickness of the dielectric layer 3 is 800 Å and those of the reading layer 4 and the recording layer 5 are 200 and 600 Å respectively as referred to on the explanation of FIG. 1, and that of the dielectric layer 6 is 250 Å. The medium 1 before being overwritten has been written in by use of recording signals of a single frequency of 1.85 MHz. The tester is adapted to jump one track after writing in every one track. The recording signal used for overwriting is of a single frequency of 1.0 MHz.

In view of FIG. 6, an overwriting detection signal 13 shown by the thick and solid line and having a large amplitude is obtained upon application of the laser beam of 4.0 mW of recording output, and its frequency corresponds to that (1.0 MHz) of the recording signals. Hence, it was confirmed to be possible to verify the written data upon its overwriting. For the reference, the data previously recorded upon the frequency of 1.85 MHz was reproduced before overwriting by the use of a laser beam of 4.0 mW, the result of which is shown as a detecting signal 14 in FIG. 6.

Figure 7:
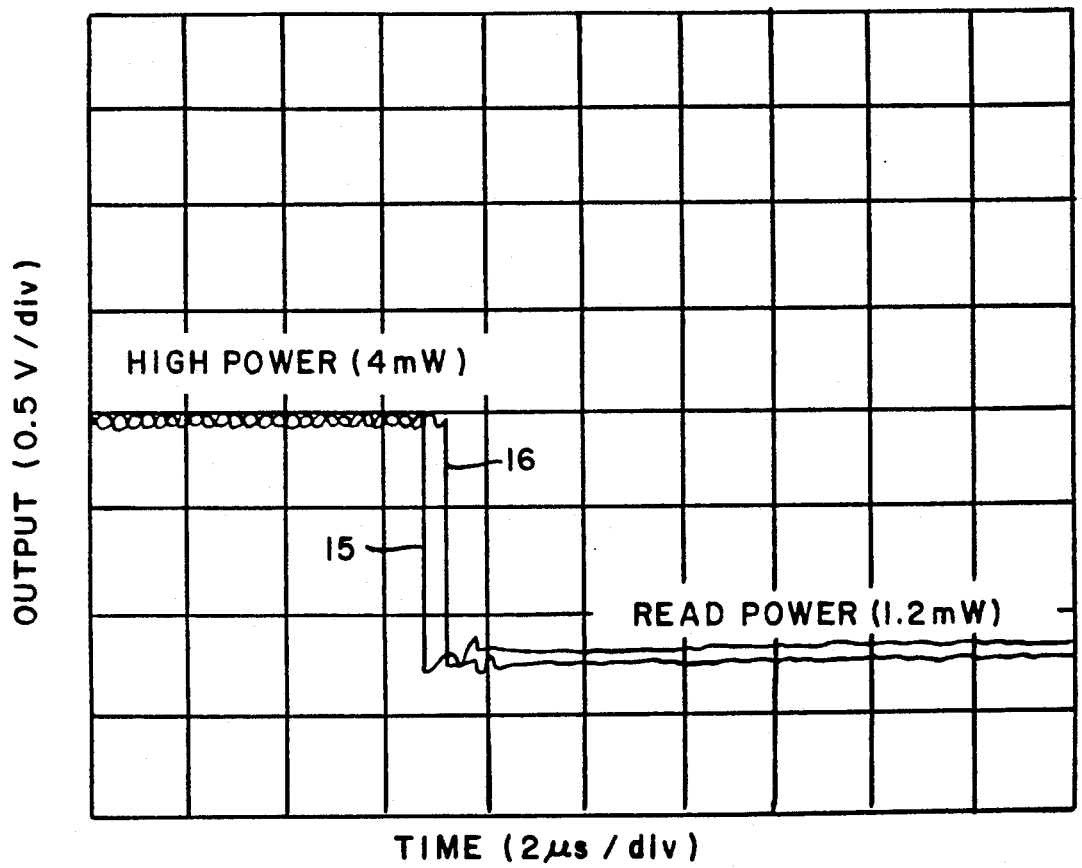

The detected signals upon overwriting by use of a conventional magneto-optic memory medium is shown in FIG. 7 as a comparative example. A magneto-optic memory medium used in this comparison comprises a four-layered structure including a dielectric layer made of AlN, a recording layer made of GdTbFe, a dielectric layer made of AlN and a reflective layer made of Al, those being laminated in this order on a glass substrate. Also in the comparative example, the medium before being overwritten has been written in by recording signals of 1.85 MHz of a single frequency, and recording signals used for overwriting has 1.0 MHz of a single frequency.

In view of FIG. 7, since the Kerr rotation angle $\theta_k$ of the above memory layer is small, the overwriting detection signal 15 shown by the thick and solid line and having a rather small amplitude is obtained upon application of the laser beam of 4.0 mW of recording output, and its frequency corresponds to that (1.85 MHz) of a previous recording signal. Hence, it was confirmed that a previously recorded data was detected, which is of no use for the verification. For the reference, the data previously recorded upon the frequency of 1.85 MHz was reproduced by the use of a laser beam of 4.0 mW, the result of which is also shown as a detecting signal 16 in FIG. 7.

The recording method for a magneto-optic memory medium of the present invention is not limited in application to the magneto-optic memory medium having the abovesaid construction. Various examples of magneto-optic memory mediums applicable to the present invention will be detailed hereunder.

Figure 8:
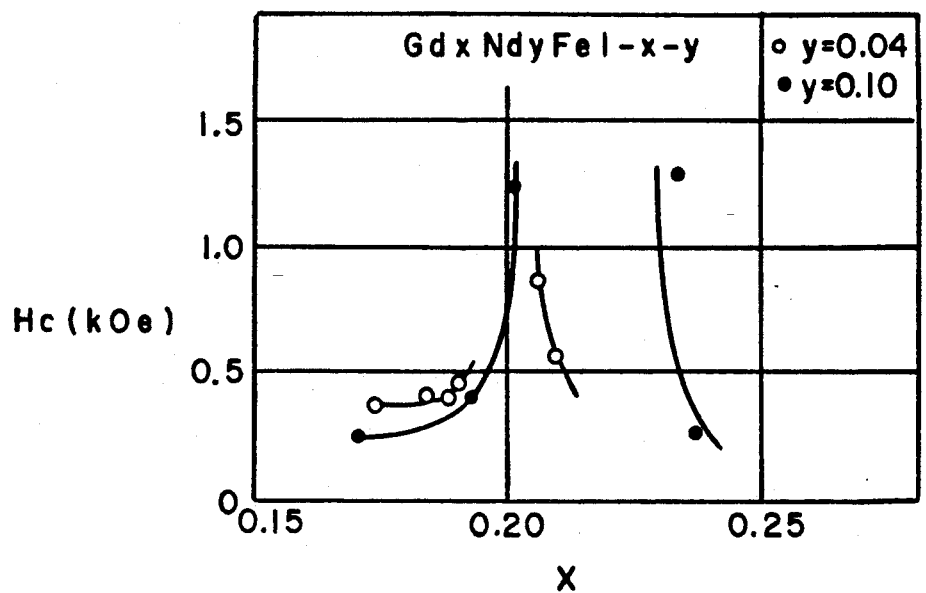

A composition of GdNdFe forming the reading layer 4 will be referred to. A compositional dependency of a coercive force Hc of GdNdFe at room temperature is shown in FIG. 8, wherein a characteristic when a composition ratio of Nd is fixed at about 4% is shown by the mark O and that with a Nd composition ratio at about 10% is shown by the mark . In the case where the Nd composition ratio is fixed at about 4%, the coercive force of GdNdFe at room temperature is about 0.4 to 0.9 kOe, but it is restrained to be less than 0.1 kOe at high temperature more than 100° C. By use of a two-layered structure comprising the reading layer 4 and a recording layer 5 made of GdTbFe, the values of a coercive force $H_c$ at room temperature was about 0.15 kOe within the range of Gd composition ratio about 17 to 25% as seen in FIG. 2. Also, the Curie temperature of GdNdFe was higher than 190° C. as a whole to fully exceed the writing temperature.

Figure 9:
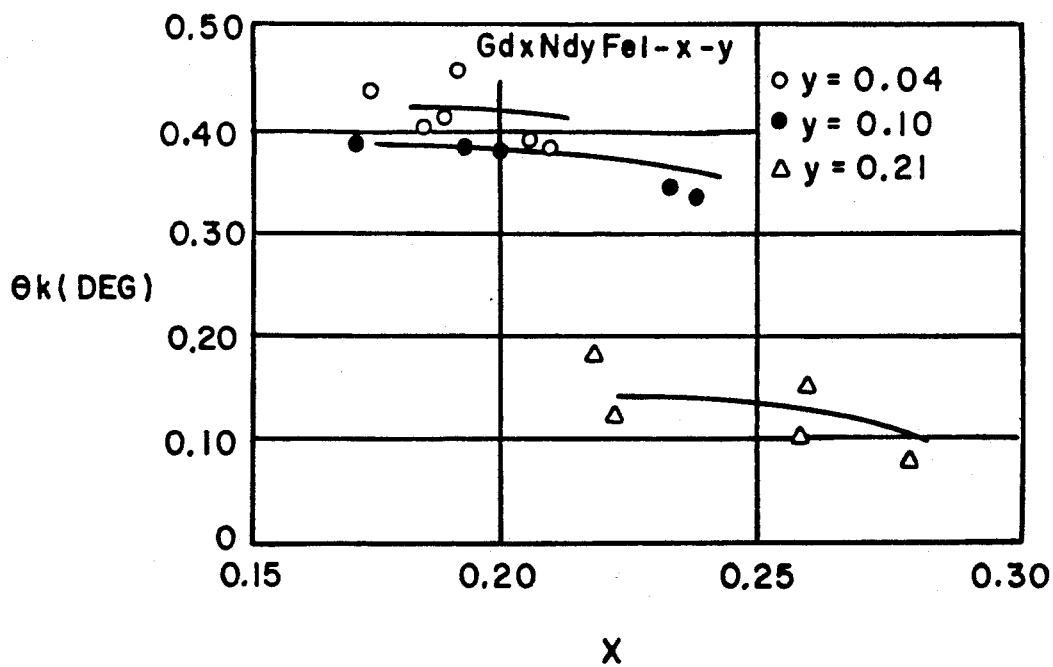

A compositional dependency of a Kerr rotation angle of GdNdFe is shown in FIG. 9, wherein a characteristic when a composition ratio of Nd is fixed at about 4% is shown by the mark o, that with a Nd composition ratio at about 10% by the mark , and that with a Nd composition ratio at about 21% by the mark Δ. In the case where the Nd composition ratio is fixed at about 4%, the Kerr rotation angle $\theta_k$ exhibits a high value as about 0.4 (deg) within the range of Gd composition ratio about 17 to 25%.

As the result, when a composition ratio of Nd in the GdNdFe forming the reading layer 4 is fixed at about 4%, a composition ratio of Gd can be set to be about 17 to 25%.

Any combinations of the reading layer 4 of film thickness in the range 150 to 600 Å with the recording layer 5 of film thickness in the range 200 to 600 Å exhibit a substantially identical characteristic to that disclosed in the present example of the invention, thereby enabling the overwriting and the verification to be performed simultaneously.

Also, when the characteristics of GdNdFe of the reading layer 4, such as a coercive force $H_c$, a Kerr rotation angle $\theta_k$ and a Curie temperature are controlled in an optimum range, the magneto-optic memory medium for the recording layer 5 may be made of TbFeCo, DyFeCo and GdTbFeCo and the like.

Figure 10:
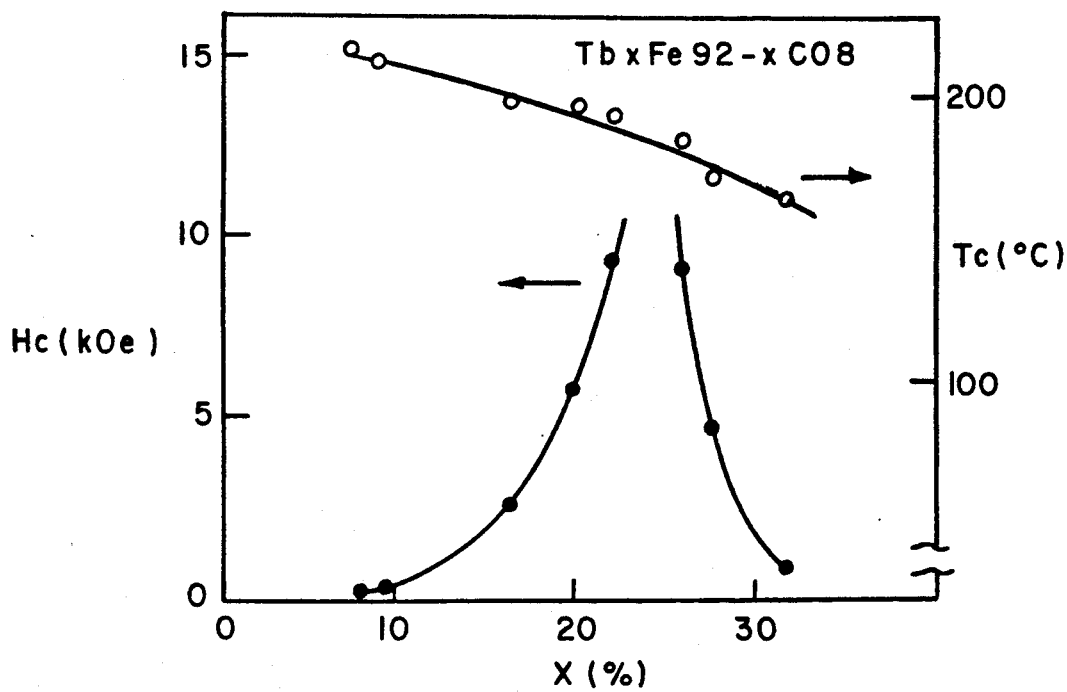

Furthermore, such a magneto-optic memory medium may be employed, which comprises a glass substrate 2 and a dielectric layer 3 which is made of AlN and has film thickness 800 Å, a reading layer 4 which is made of TbFeCo and has film thickness 200 Å, a recording layer 5 which is made of TbFeCo in a different composition ratio to that of the reading layer and has film thickness 600 Å, and a dielectric layer 6 which is made of AlN and has film thickness 250 Å, those formed in this order on the glass substrate 2. In this case, a composition ratio of TbFeCo forming the reading layer 4 was set as Tb 10.0, Fe 82.0, Co 8.0 at %, and that of TbFeCo forming the recording layer 5 was set as Tb 24.0, Fe 68.0, Co 8.0 at %. A compositional dependency of a coercive force $H_c$ and a Curie temperature $T_c$ of TbFeCo when a composition ratio of Co is fixed at 8.0% is shown in FIG. 10, wherein the compositional dependency of a coercive force $H_c$ is shown by the mark o, and that of a Curie temperature $T_c$ by the mark . In view of FIG. 10, a coercive force $H_c$ of the reading layer 4 with Tb composition ratio being 10.0% is about 0.4 kOe. Also, the recording layer 5 with Tb composition ratio 24.0% is substantially compensated in composition. It was confirmed that a magneto-optic memory medium constructed as above can simultaneously permit the overwriting and the verification.

Figure 11:
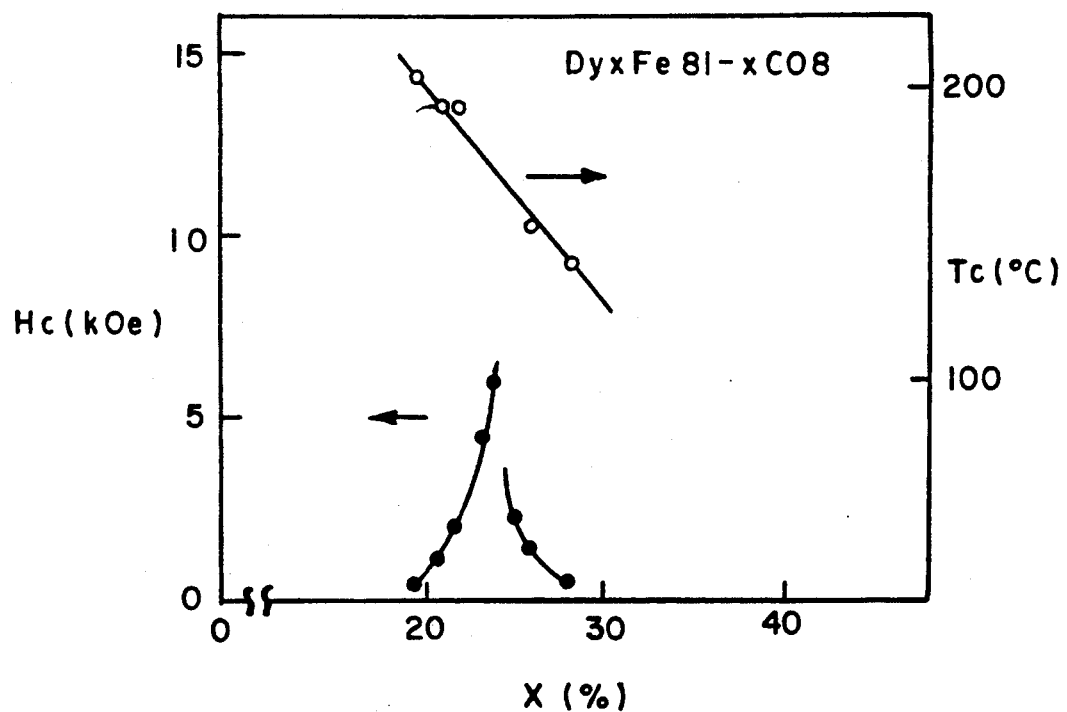

A compositional dependency of a coercive force $H_c$ and a Curie temperature $T_c$ of DyFeCo when a composition ratio of Co is fixed at 19.0% is shown in FIG. 11, wherein the compositional dependency of a coercive force $H_c$ is shown by the mark o, and that of a Curie temperature $T_c$ by the mark similarly to FIG. 10. In view of FIG. 11, a composition ratio of DyFeCo forming the reading layer 4 and that of DyFeCo forming the recording layer 5 can be selected with an optimum value similarly to the above TbFeCo.

Although the reading layer 4 and the recording layer 5 may be made of the same material having different compositions, the recording layer 5 may be made of GdTbFe, GdTbFeCo, NdDyFeCo and GdDyFe and the like.

What we claimed is:

1. A recording method for a magneto-optic memory medium of exchange-coupled type having a recording layer of a low Curie point and high coercive force and a reading layer of a high Curie point and low coercive force, which comprises the steps of:
   applying a magnetic field to the magneto-optic memory medium to develop a predetermined data in the reading layer,
   and then applying both an optical beam and a magnetic field to the magneto-optic memory medium for writing the predetermined data in the recording layer, and simultaneously verifying the data upon said writing on the basis of a Kerr effect of the optical beam caused by the reading layer.

2. The recording method of claim 1 in which the recording layer is a GdTbFe amorphous alloy thin film and the reading layer is a GdNdFe amorphous alloy thin film.

3. The recording method of claim 2 in which each of the recording and reading layers has a thickness of 100 to 1000 Å.

4. The recording method of claim 2 in which the recording layer has a thickness of 200 to 600 Å and the reading layer has a thickness of 150 to 600 Å.

5. A recording method for a magneto-optic memory medium of exchange coupled type having a recording layer of a low Curie point of a GdTbFe amorphous alloy thin film in which the Gd Tb Fe amorphous alloy is represented by the following formula:

$$(Gd_pTb_{1-p})_qFe_{1-q}$$

(wherein p and q satisfy the inequalities $0.1 < q$, $0.35$, $0 < p \times q < 0.25$, $0 < (1-p) \times q$, $0.25$), and a reading layer of a high Curie point and low coercive force of a GdNdFe amorphous alloy thin film wherein the GdNdFe amorphous alloy is represented by the following formula:

$$Gd_xNd_yFe_{1-x-y}$$

(wherein x and y satisfy the inequalities $0.1 < X < 0.3$ and $0 < y < 0.25$), which method comprises the steps of applying a magnetic field to the magneto-optic memory medium to develop a predetermined data in the reading layer, and then applying both an optical beam and a magnetic field to the magneto-optic memory medium for writing the predetermined data in the recording layer, and simultaneously verifying the data upon said writing on the basis of a Kerr effect of the optical beam caused by the reading layer.

6. A recording method of claim 5, in which said optical beam is substantially a constant intensity and a method of said writing the predetermined data in the recording layer is applied by an inversion of the magnetic field.

* * * * *